(No Model.)
J. KUHNMÜNCH.
MIDDLINGS PURIFIER.
No. 288,068. Patented Nov. 6, 1883.
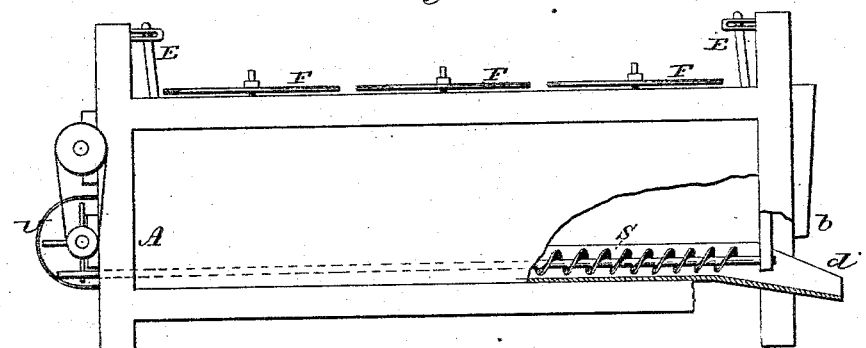
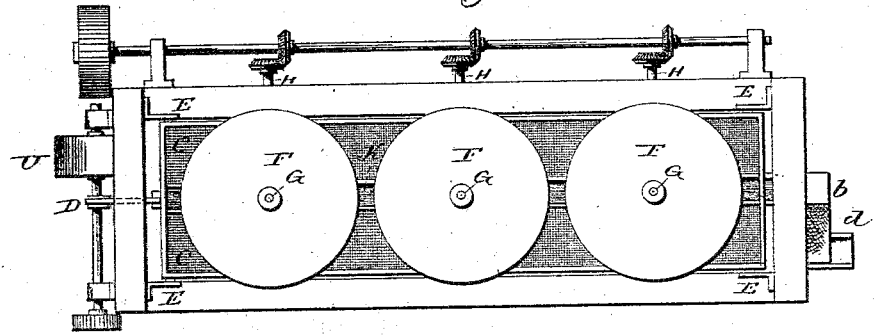
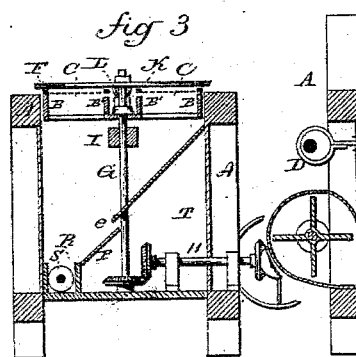
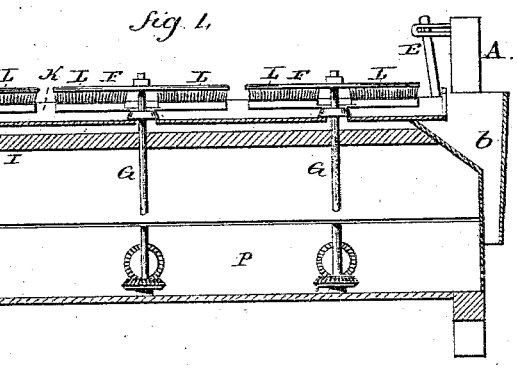

UNITED STATES PATENT OFFICE.

JOSEPH KUHNMÜNCH, OF RÖTTINGEN-ON-THE-TAUBER, GERMANY, ASSIGNOR TO THE ELECTRIC PURIFIER COMPANY, OF NEW HAVEN, CONN.

MIDDLINGS-PURIFIER.

SPECIFICATION forming part of Letters Patent No. 288,068, dated November 6, 1883.

Application filed August 6, 1883. (No model.)

*To all whom it may concern:*

Be it known that I, JOSEPH KUHNMÜNCH, of Röttingen-on-the-Tauber, Germany, temporarily residing in the city of New Haven, in the county of New Haven and State of Connecticut, have invented new Improvements in Middlings-Purifiers; and I do hereby declare the following, when taken in connection with the accompanying drawings and the letters of reference marked thereon, to be a full, clear, and exact description of the same, and which said drawings constitute part of this specification, and represent, in—

Figure 1, a side view of the machine partly broken away; Fig. 2, a top view of the machine; Fig. 3, a transverse section, and Fig. 4 a longitudinal section.

This invention relates to an improvement in apparatus for purifying ground grain—such as wheat, &c.—by removing all the particles which depreciate the quality of the flour, and commonly called "middlings-purifiers;" and the invention is an improvement upon or embodies the process for which Letters Patent of the United States were granted to Thomas B. Osborne, No. 224,719, dated February 17, 1880. In the original patent of Osborne the ground material to be purified is passed beneath electrified cylinders, which attract to their surface the lighter particles, which tend to depreciate the quality of the flour. The cylinders, revolving, take these particles to a position where they are brushed into a receptacle and delivered from the machine. In this apparatus only a small surface of each cylinder is presented to the flour for action. In later improvements electrified plates have been arranged horizontally over the ground material and stationary, with a device for removing the light particles attracted to that stationary electrified surface. In another improvement horizontal reciprocating electrified plates have been employed. Both of these improvements, while they present a larger surface to the ground material, complicate the machinery, and in the latter case the apparatus occupies a largely-increased space.

The object of my invention is to present an extended horizontal moving surface within a narrow space; and it consists, essentially, in one or more electrified disks revolving in a horizontal plane over the ground material passing beneath it, combined with a brushing device to remove the particles attracted to the surface of the disk and deliver such particles into a conductor from the machine, and as more fully hereinafter described.

A represents the frame of the machine; B B, the two outer sides of the sieve-frame; B' B', two bars parallel with each other and with the sides extending longitudinally through the frame; C, the sieve-cloth, onto which the ground material to be treated is delivered. To this sieve a reciprocating movement is imparted by a cam or eccentric, D, working against the end of the sieve-frame or in connection with it, so that by the rotation of the eccentric or cam sufficient movement is imparted to the sieve to agitate the material therein. The sieve is suspended from above by links E, or otherwise arranged, so that a sufficient agitation may be applied to the sieve to cause the flour to pass through it, and which operation brings the lighter particles to the top.

F F are disks, made preferably of hard rubber, and arranged in a horizontal plane upon vertical shafts G, the diameter of the disks being little greater than the width of the sieve, and the plane of the disks substantially parallel with the plane of the sieve. The disks are caused to revolve by the application of power thereto through counter-shafts H, and the counter-shafts are provided with bevel-pinions and the disk-shafts with corresponding bevel-pinions, as shown. The several counter-shafts are driven by a horizontal shaft extending along the side of the machine, and provided with bevel-pinions working into corresponding pinions on the counter-shafts H, as shown, the power being applied to the horizontal shaft through a pulley thereon; or the disk-shafts may be driven by other well-known mechanical appliances. The shafts extend up through the sieve between the two bars B' B', suitable slots being made to permit the sieve-frames to reciprocate the shafts supported in suitable bearings, I.

Between the two bars B' B' is a trough-like conductor, K, which leads longitudinally through the machine above the sieves and terminates in an outlet, b. Centrally over the conductor, and at each side of the shaft, is a radial brush, L, of wool or other material, which will electrify the surface of the disk F. These brushes are supported independent of the disks and so as to remain stationary while the disks revolve. This may be done by connections or arms extending from the brushes to the sides of the frame of the machine; or they may be secured to the trough or sieve, so as to receive the same reciprocating movement as the sieve, such movement not interfering with their proper action upon the disks; or they may be, as shown, attached to collars which encircle the shafts, but which are prevented from rotation with the shafts, it only being essential that they shall be substantially fixed in proper position beneath the disks.

Below the sieves is an inclined floor, P, upon which the middlings fall, and are thereby conducted to a trough, R. In this trough is a conveyer, S, which may be an endless screw or any suitable conveyer which will take the middlings as it falls therein and deliver it from the machine, as at d.

Through the floor P apertures e are made, more or less in number. That part of the frame beneath the floor is inclosed to form an air-chamber, T. Into this chamber a blast of air is driven by a blower, U, or otherwise, which passes through the apertures e upward to and through the sieve. This blast of air not only serves to cool the flour, but also to throw the material up from the sieve and add to its agitation, and also to facilitate the rising of the lighter particles into contact with the electrified surfaces.

In operation, the disks F revolve, the sieves operate to agitate the material passing thereon beneath the disks, so that the lighter particles are attracted to the under surface of the disks, and, adhering thereto, are carried around until they come in contact with the brushes L, where they are removed by contact with the brushes and fall into the trough K below, from whence they pass out through the conductor at b. The brushes therefore serve both to electrify the disks and remove the particles attached thereto, as in the Osborne process.

Several disks may employed, or a single disk may in some cases serve the desired purpose. By this arrangement of disks a central and single conductor is all that is required to deliver the lighter particles from the machine, that one conductor serving for all the disks, and, being in a central position, occupies less space than in previous arrangements.

By employing the rotating disks a larger amount of electrified surface is presented to the material compared to the space necessary for the operation of plates, as in the apparatus hereinbefore mentioned.

While the brushes may be thus employed to remove the particles attracted to the surface of the disks, strippers may be employed independent of the brushes.

This arrangement of sieves, the inclined floor, air-chamber, and apertures e may be employed with other electrified surfaces than the revolving disk herein described. I therefore do not wish to be understood as limiting this part of my invention to the employment of the revolving disks.

I claim—

1. The combination of a receiver for the ground material, arranged and operating to agitate the ground material passing thereon, with one or more electrified disks above the surface of said ground material, arranged to revolve in a plane substantially parallel with the surface of said ground material, substantially as described.

2. The combination of a receiver for the ground material, arranged and operating to agitate the said ground material passing thereon, one or more electrified disks above the surface of the said ground material, arranged to revolve in a plane substantially parallel with the surface of said ground material, a brush or brushes, L, arranged in a position substantially radial to said disks and over which the surface of said disks will pass, substantially as described.

3. The combination of a receiver for the ground material, arranged and operating to agitate the said ground material passing thereon, one or more electrified disks above the surface of the said ground material, arranged to revolve in a plane substantially parallel with the surface of said ground material, a brush or brushes, L, arranged in a position substantially radial to said disks and over which the surface of said disks will pass, and the longitudinal conductor K to receive the particles attracted to the surface of the disks, substantially as described.

4. In a middlings-purifier, the combination of the receiver for the ground material, its bottom forming a sieve through which the middlings will pass, an electrified surface above said receiver, arranged and operating to attract the lighter particles from the ground material, an inclined floor beneath the sieve, upon which the flour will fall and pass to a conveyer, an air-chamber beneath said floor, with apertures through the floor, whereby a blast introduced into said air-chamber will pass through said apertures in the floor and into contact with the material on the receivers, substantially as described.

JOSEPH KUHNMÜNCH.

Witnesses:
JOHN E. EARLE,
JOS. C. EARLE.